July 20, 1948. W. R. HODELL 2,445,432
BEARING ASSEMBLY
Filed July 24, 1945 2 Sheets-Sheet 1

WITNESSES:

INVENTOR
William R. Hodell.
BY
O. B. Buchanan
ATTORNEY

July 20, 1948. W. R. HODELL 2,445,432
BEARING ASSEMBLY
Filed July 24, 1945 2 Sheets-Sheet 2
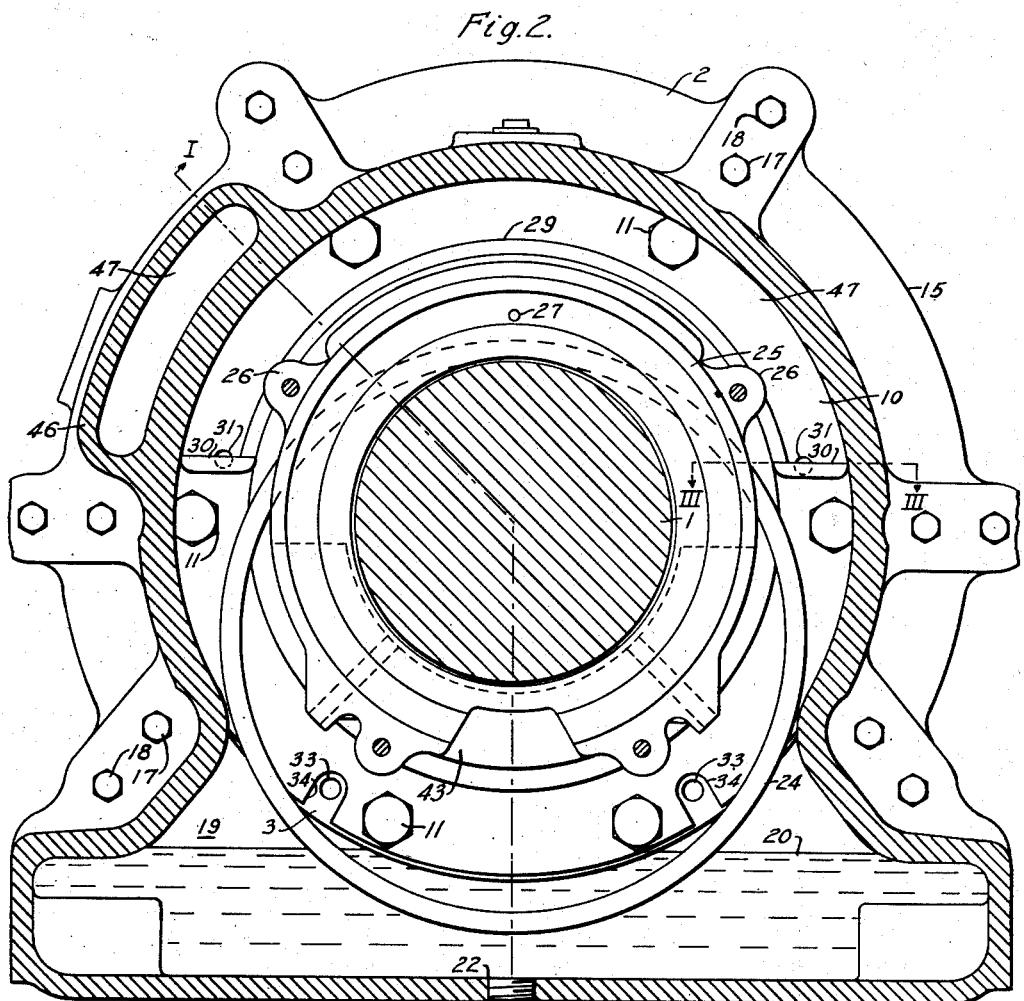
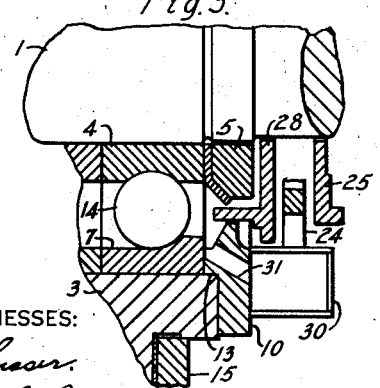
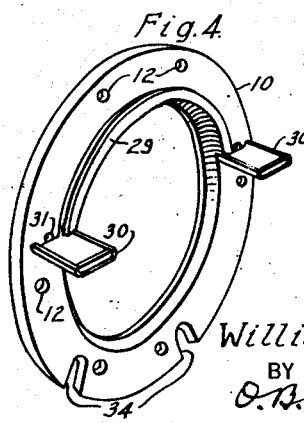
WITNESSES:
N. F. Snoser
F. P. Lyle
INVENTOR
William R. Hodell.
BY
O. B. Buchanan
ATTORNEY Patented July 20, 1948

2,445,432

UNITED STATES PATENT OFFICE 2,445,432

BEARING ASSEMBLY

William R. Hodell, Pittsburgh, Pa., assignor to Westinghouse Electric Corporation, East Pittsburgh, Pa., a corporation of Pennsylvania Application July 24, 1945, Serial No. 606,729

2 Claims. (Cl. 308—128)

The present invention relates to bearing assemblies for supporting horizontal rotating shafts, and, more particularly, to improved lubricating means for oil-ring-lubricated anti-friction bearings.

The invention is especially directed to improving the lubrication of horizontal, oil-lubricated antifriction bearings of the cartridge type, in which the bearings themselves are supported in a cartridge or housing, and lubricated by means of an oil ring riding on the shaft adjacent the cartridge, usually with means for directing oil from the oil ring into the bearing. It has been found that when bearings of this type are used to support shafts rotating at relatively high speeds, a large part of the oil carried from the oil reservoir by the oil ring is thrown off the ring in the form of mist and small drops. In the conventional construction, some of this oil thrown off the oil ring falls directly back into the reservoir, and some of it strikes the interior surfaces of the housing structure, from which it drains back into the reservoir, so that all of the oil thrown off the ring returns to the reservoir without reaching the bearing. This is very undesirable in the case of shafts rotating at high speeds, such as 3600 R. P. M., for example, and especially where the shaft carries a heavy load, since as much as 50% of the oil carried from the reservoir by the oil ring may be thrown off in this manner. This oil is needed at high speeds, and when the bearing is carrying a heavy load, and the failure of this oil to reach the bearing results in inadequate lubrication, shortening the life of the bearing and leading to early failure.

The principal object of the present invention is to provide an oil-ring-lubricated anti-friction bearing assembly, for high-speed shafts, in which a much larger part of the oil carried from the reservoir by the oil ring reaches the bearing than in previous bearings of this type.

A further object of the invention is to provide an oil-ring-lubricated anti-friction bearing assembly which includes means for catching oil thrown off the oil ring and directing this oil into the bearing, so as to obtain adequate lubrication even at high speeds where a relatively large amount of oil is thrown off the oil ring.

Other objects and advantages of the invention will be apparent from the following detailed description, taken in connection with the accompanying drawings, in which:

Fig. 2 is a transverse sectional view approximately on the line II—II of Fig. 1;

Fig. 3 is a fragmentary sectional view approximately on the line III—III of Fig. 2; and Fig. 4 is a perspective view of a cap member.

Figure 1:
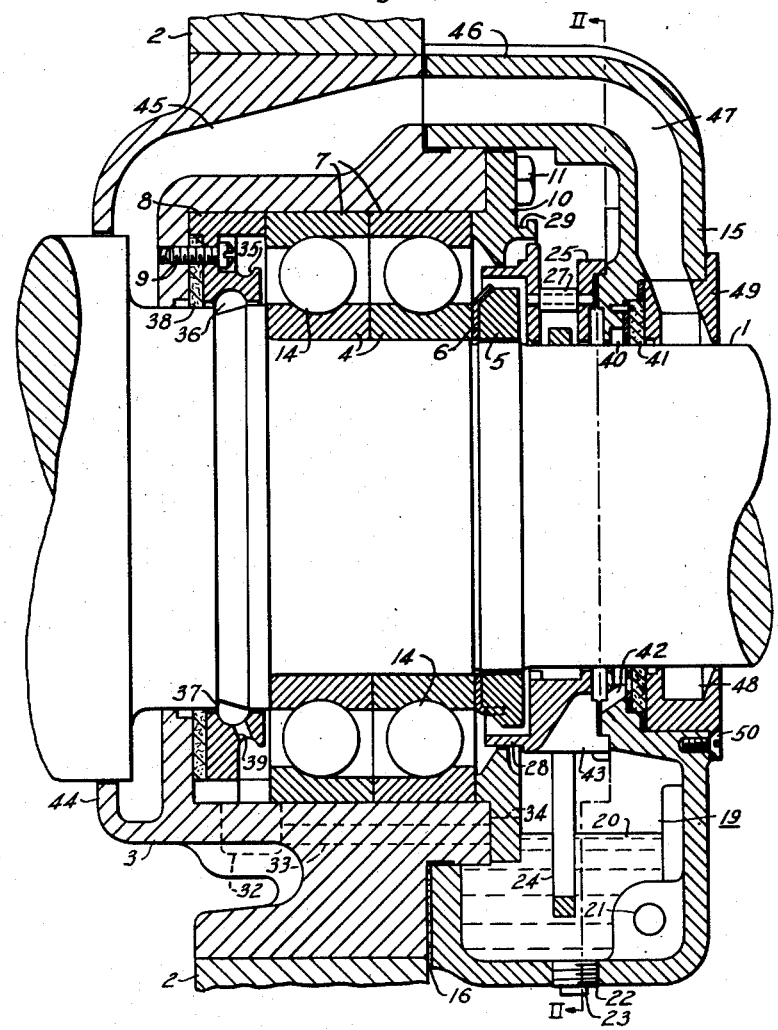
Figure 1 is a longitudinal sectional view of a bearing assembly embodying the invention, the section being taken approximately on the line I—I of Fig. 2.

The invention is shown in the drawings embodied in a cartridge-type anti-friction bearing assembly for supporting a horizontal shaft 1. The bearing assembly, as a whole, is supported in a bracket or frame structure indicated at 2, which may, for example, be an end bracket of an electric motor, and which has not been shown in detail since it forms no part of the invention. The bearing assembly includes a generally cylindrical cartridge member or bearing housing 3, which fits snugly in a bore in the bracket 2. In the illustrated embodiment of the invention, the bearing itself is a double-row ball bearing, the inner races 4 of which are pressed on the shaft 1, and held against a shoulder on the shaft by means of a nut 5 and lock washer 6. The outer races 7 fit closely in cartridge 3, and are retained in position axially by an annular cartridge cap 10, which is secured to the end surface of the cartridge 3 by means of screws 11 passing through holes 12 in the cap. The cartridge cap 10 has an inwardly extending flange 13 which bears against the outer races 7 to hold them firmly against a ring 8, which is retained in the inner end of the cartridge in any suitable manner, as by screws 9. In this way, the bearing, consisting of the inner races 4, outer races 7, and balls 14, is positively retained in axial position.

The outer end of the cartridge member 3 is closed by an outer bearing cap 15, the joint between the bearing cap 15 and the cartridge 3 being made oil-tight by a gasket 16. The outer bearing cap 15 is secured to the cartridge member 3 by means of screws 17 threaded into the cartridge through holes in the periphery of the bearing cap, and the entire assembly is secured to the bracket 2 by means of screws 18 passing through holes in a series of spaced projections about the periphery of the bearing cap 15, as shown in Fig. 2. The outer bearing cap 15 has an enlarged lower portion forming an oil reservoir 19, which contains oil 20 for lubricating the bearing. The oil reservoir 19 preferably has an opening 21 for the reception of an overflow plug, and a drain opening 22 at the bottom for draining oil from the reservoir, the opening 22 being normally closed by a plug 23.

Oil is carried from the reservoir 19 to the bearing by means of an oil ring 24, which rides on the shaft 1, and which is sufficiently large in diameter to extend down into the oil reservoir below the normal level of the oil 20. The oil ring 24 is held in position, and oil is directed from the oil ring to the bearing, by means of an oil ring retainer 25. The retainer 25 is an annular member encircling the shaft, and it may be secured to the inner surface of the bearing cap 15 in any suitable manner, as by means of screws passing through peripheral lugs 26 on the retainer. The oil ring retainer 25, as clearly shown in Figs. 1 and 2, is transversely notched to a point somewhat below the horizontal center-line of the assembly to receive the ring 24, and a pin 27 may be provided between the two sides of the notched retainer at the top, so as to prevent the oil ring 24 from being thrown out of the retainer by the rotation of the shaft. When the shaft is rotating, the oil ring 24 is caused to rotate by the movement of the shaft and carries oil up from the reservoir 19. Oil from the oil ring runs down between the two parts of the notched retainer 25 to the bottom of the notch, and drains into the bearing, being directed into the bearing by an axially extending flange 28 on the retainer 25.

When the shaft 1 is rotating at high speed, the ring 24 also rotates at high speed, and, as previously described, a considerable part of the oil carried from the reservoir 19 by the ring 24 is thrown off the ring by centrifugal force, so that it is not directed into the bearing by the retainer 25. In order to prevent this oil from draining back into the reservoir without reaching the bearing, the present invention provides means for catching at least a large part of the oil thrown off the oil ring and directing it into the bearing. In the illustrated embodiment of the invention, this means includes an annular groove 29 formed by a circumferentially extending flange on the cartridge cap 10. The groove 29 extends circumferentially around the upper part of the annular cartridge cap 10 down to a point slightly above the horizontal center-line on each side of the cap, and at each end of the groove 29 there is positioned an oil basin or cup 30. These basins 30 may be shallow sheet metal cups welded to the surface of the cap 10 in position to receive oil flowing through the groove 29. A hole 31 is drilled through the cartridge cap 10 adjacent to each of the basins 30, at a slight angle to the axis of the cap 10, so as to extend through the cap and its flange 13 and terminates close to the bearing.

When the shaft 1 is rotating, a large part of the oil thrown off the oil ring 24 is caught directly by the groove 29, and a considerable part of the oil thrown from the ring against the inner surface of the bearing cap 15, and the outer surface of the cartridge cap 10, drains into the groove 29. The oil caught by the groove 29 flows circumferentially through the groove in one direction or the other and into one or the other of the basins 30. The oil received in the basins 30 drains from them through the holes 31 and thus into the bearing. In this way, a large part of the oil thrown off the oil ring 24 is prevented from draining back into the reservoir, and is caught and directed into the bearing where it is needed.

The oil which is directed into the bearing, both by the retainer 25 and through the holes 31, passes through the bearing to the opposite end, from which it flows into recesses 32 formed in the cartridge member 3 on opposite sides near the bottom of the assembly. The oil flowing into the recesses 32 drains out through oil return passages 33 and flows back into the reservoir 19, the cartridge cap 10 having notches 34 opposite the ends of the oil return passages 33.

The ring member 8 at the inner end of the cartridge member 3 has a circumferential groove or gutter 35 to catch oil escaping from the bearing, and the oil caught in the groove 35 drains to the bottom and flows into the recesses 32. The ring 8 has a narrow clearance about the shaft adjacent the bearing and beyond the narrow clearance is an enlarged annular space 36 adjacent to an oil thrower shoulder 37 on the shaft. A felt washer 38 engages the shaft beyond the shoulder 37. These elements prevent the passage of any oil along the shaft, and thus prevent the leakage of oil from the bearing. Any oil thrown off the shaft by the oil thrower shoulder 37 drains through passages 39 into the recesses 32, and thence returns to the reservoir 19. Similar means are provided at the opposite end of the assembly to prevent leakage of oil along the shaft. Thus, the outer bearing cap 15 has a close clearance around the shaft 1 adjacent the oil ring retainer 25, beyond which is an enlarged space 40, and beyond that a felt washer 41 engaging the shaft. Oil travelling along the shaft and caught by these elements drains back to the reservoir 19 through a passage 42, and a notch or recess 43 in the retainer 25.

The cartridge member 3 has an annular space, or air chamber 44 cast in it encircling the shaft 1 at the inner end of the assembly, and the air chamber 44 communicates with a passage 45 extending through the cartridge 3. The outer bearing cap 15 has an enlargement or boss 46 at one side, within which is a passage 47 which coincides in position with the passage 45 in the cartridge, so as to form a continuous passageway from the annular air chamber 44. The other end of the passage 47 communicates with an annular air chamber 48 formed in a cap member 49 encircling the shaft at the outer end of the bearing assembly. The cap member 49 may be secured to the outer bearing cap 15 in any suitable manner, as by screws 50, or may be integral with the bearing cap 15. The annular air chambers 44 and 48 and the connecting passages 45 and 47 equalize the air pressures at opposite sides of the bearing, so as to prevent any oil or oil mist being drawn or sucked through the bearing assembly because of unequal air pressures.

It should now be apparent that an oil-ring-lubricated anti-friction bearing assembly has been provided in which provision is made for catching oil thrown off the oil ring, so that this oil is prevented from returning to the reservoir and is directed into the bearing. This construction is quite effective, and is very desirable for high-speed operation, where great difficulty has heretofore been encountered in adequately lubricating the bearing, because of the relatively large amount of oil thrown off the oil ring by centrifugal force at high speeds. A particular embodiment of the invention has been shown and described for the purpose of illustration, but it will be apparent that the invention can be applied to other types of bearing assemblies and that it is not restricted to the particular structure shown. It is to be understood, therefore, that the invention is not limited to the particular details of construction shown and described, but in its broadest aspects, it includes all equivalent embodiments and modifications which come within the scope of the appended claims.

I claim as my invention:

1. A bearing assembly comprising a cartridge-type bearing housing, an anti-friction bearing in said bearing housing for supporting a rotatable shaft, an outer bearing cap closing the end of the bearing housing, said bearing cap having an oil reservoir in the lower part thereof, an oil ring on the shaft extending down into said oil reservoir for carrying oil therefrom, means for directing oil from the oil ring to the bearing, and an inner cap member disposed between said bearing housing and said outer bearing cap, said inner cap member having a circumferential groove extending around at least the upper part of the cap member for catching oil thrown off the oil ring, an oil-receiving basin at each side of the inner cap member for receiving oil from said groove, and means for draining oil from said basins into the bearing.

2. A bearing assembly comprising a housing structure, an anti-friction bearing in said housing structure for supporting a rotatable shaft, an oil reservoir in the housing structure adjacent the bearing, an oil ring on the shaft extending down into said oil reservoir for carrying oil therefrom, means for directing oil from the oil ring to the bearing, an annular member encircling the shaft between the bearing and the oil ring, said annular member having a circumferential groove extending around at least the upper part thereof for catching oil thrown off the oil ring, an oil-receiving basin at each side of the annular member for receiving oil from said groove, and means for draining oil from said basins into the bearing.

WILLIAM R. HODELL.

REFERENCES CITED

The following references are of record in the file of this patent:

UNITED STATES PATENTS

| Number | Name | Date |
|---|---|---|
| 1,564,832 | Dana | Dec. 8, 1925 |
| 1,794,921 | Ramsey | Mar. 3, 1931 |
| 1,976,322 | Blackmore | Oct. 9, 1934 |
| 2,239,283 | Brown | Apr. 22, 1941 |
| 2,335,557 | Winther | Nov. 30, 1943 |

FOREIGN PATENTS

| Number | Country | Date |
|---|---|---|
| 321,997 | Great Britain | Of 1929 |